United States Patent
Ould et al.

(10) Patent No.: US 6,988,019 B2
(45) Date of Patent: Jan. 17, 2006

(54) MACHINE TOOL CONTROL PROCESS AND APPARATUS THEREFOR

(75) Inventors: John Charles Ould, Bristol (GB); Kevin James Tett, Bristol (GB)

(73) Assignee: Renishaw PLC, Gloucestershire (GB)

(*) Notice: Subject to any disclaimer, the term of this patent is extended or adjusted under 35 U.S.C. 154(b) by 18 days.

(21) Appl. No.: 10/484,882

(22) PCT Filed: Jul. 19, 2002

(86) PCT No.: PCT/GB02/03312

§ 371 (c)(1),
(2), (4) Date: Jan. 27, 2004

(87) PCT Pub. No.: WO03/012561

PCT Pub. Date: Feb. 13, 2003

(65) Prior Publication Data

US 2004/0236460 A1  Nov. 25, 2004

(30) Foreign Application Priority Data

Jul. 30, 2001 (GB) .................................... 0118492

(51) Int. Cl.
*G06F 19/00* (2006.01)

(52) U.S. Cl. .................... 700/181; 700/12; 700/17; 700/18; 700/86; 710/5

(58) Field of Classification Search ................ 700/12, 700/17, 18, 86, 181; 718/100–101, 104, 718/10; 710/5
See application file for complete search history.

(56) References Cited

U.S. PATENT DOCUMENTS

| | | | | |
|---|---|---|---|---|
| 4,907,190 A | * | 3/1990 | Sasaki et al. | 710/5 |
| 5,564,049 A | * | 10/1996 | Schmidt | 707/104.1 |
| 6,272,388 B1 | * | 8/2001 | Buvel et al. | 700/86 |
| 6,411,857 B1 | * | 6/2002 | Flood | 700/4 |
| 6,535,782 B1 | * | 3/2003 | Tignor et al. | 700/121 |

FOREIGN PATENT DOCUMENTS

| | | |
|---|---|---|
| DE | 199 50 158 A1 | 4/2001 |
| EP | 0 065 272 A2 | 11/1982 |
| WO | WO 89/05003 | 6/1989 |

* cited by examiner

*Primary Examiner*—Leo Picard
*Assistant Examiner*—Douglas S. Lee
(74) *Attorney, Agent, or Firm*—Oliff & Berridge, PLC

(57) ABSTRACT

A machine tool control process employs an N.C. and separate software e.g. operating either in a separate processor or within the N.C. Sub-programs generated by the software may be introduced into the N.C. during pauses in the N.C. e.g. for measurement type inspection or re-configuring the paths of cutting tools. The generation of the sub-programs may be carried out while the N.C. is operating.

17 Claims, 6 Drawing Sheets

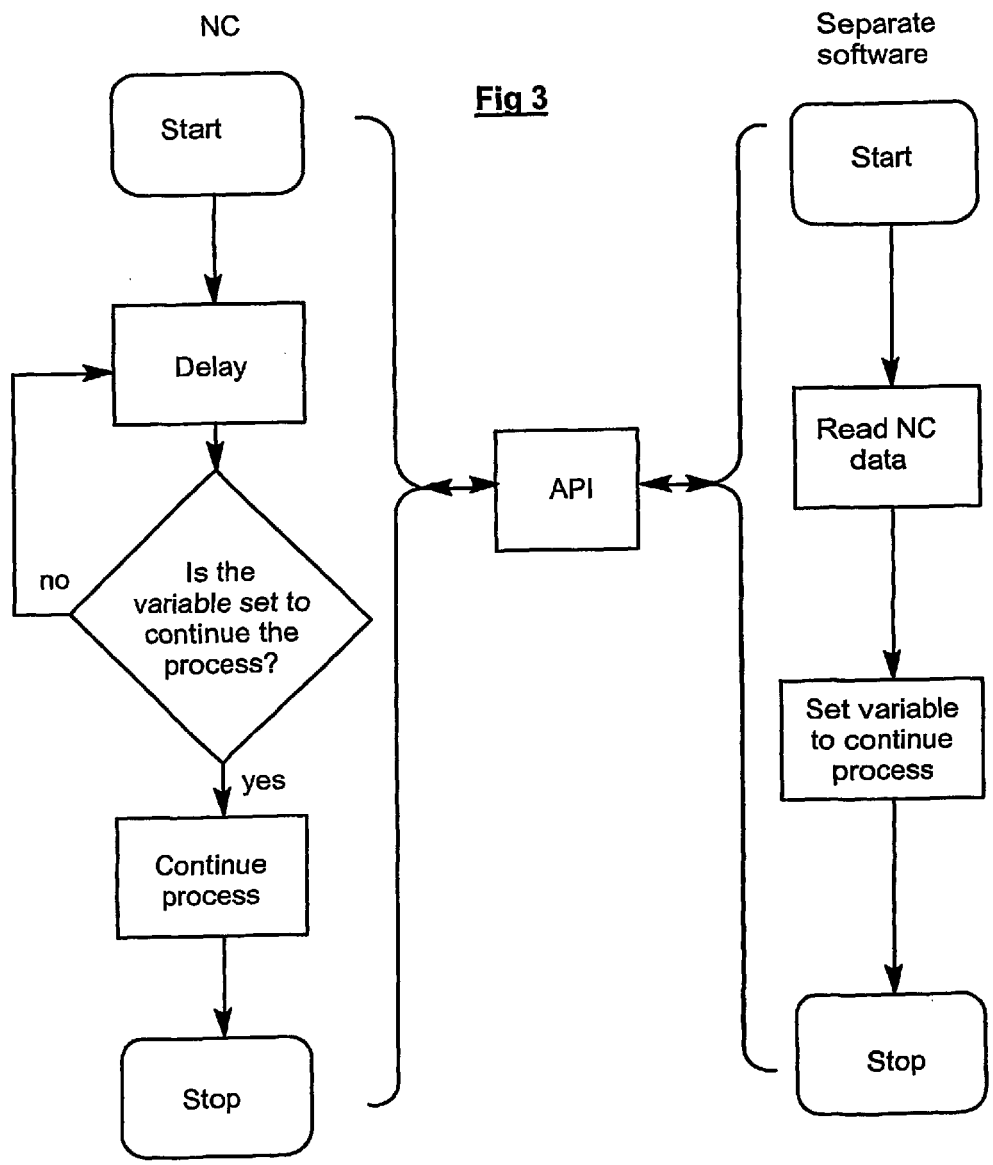

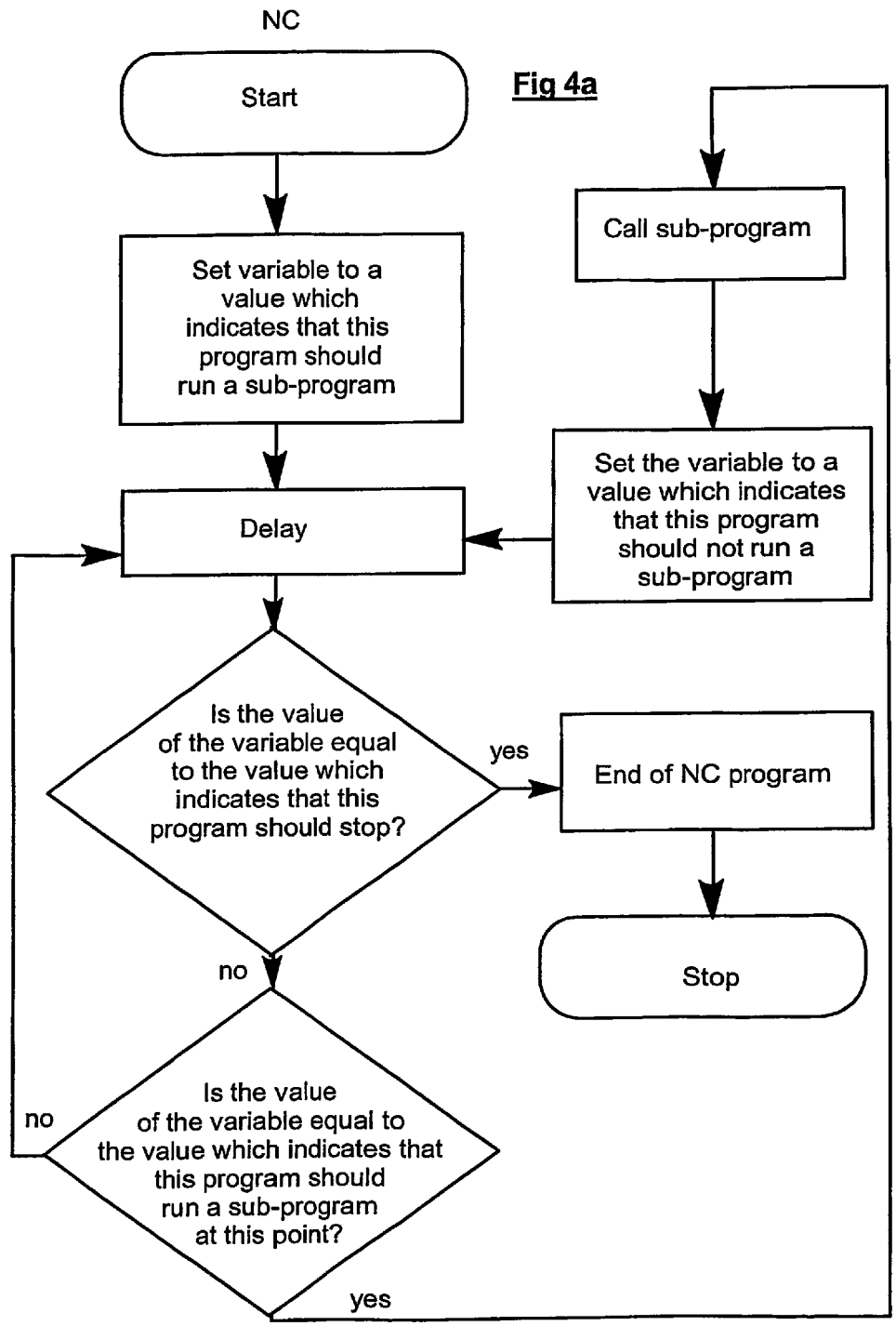

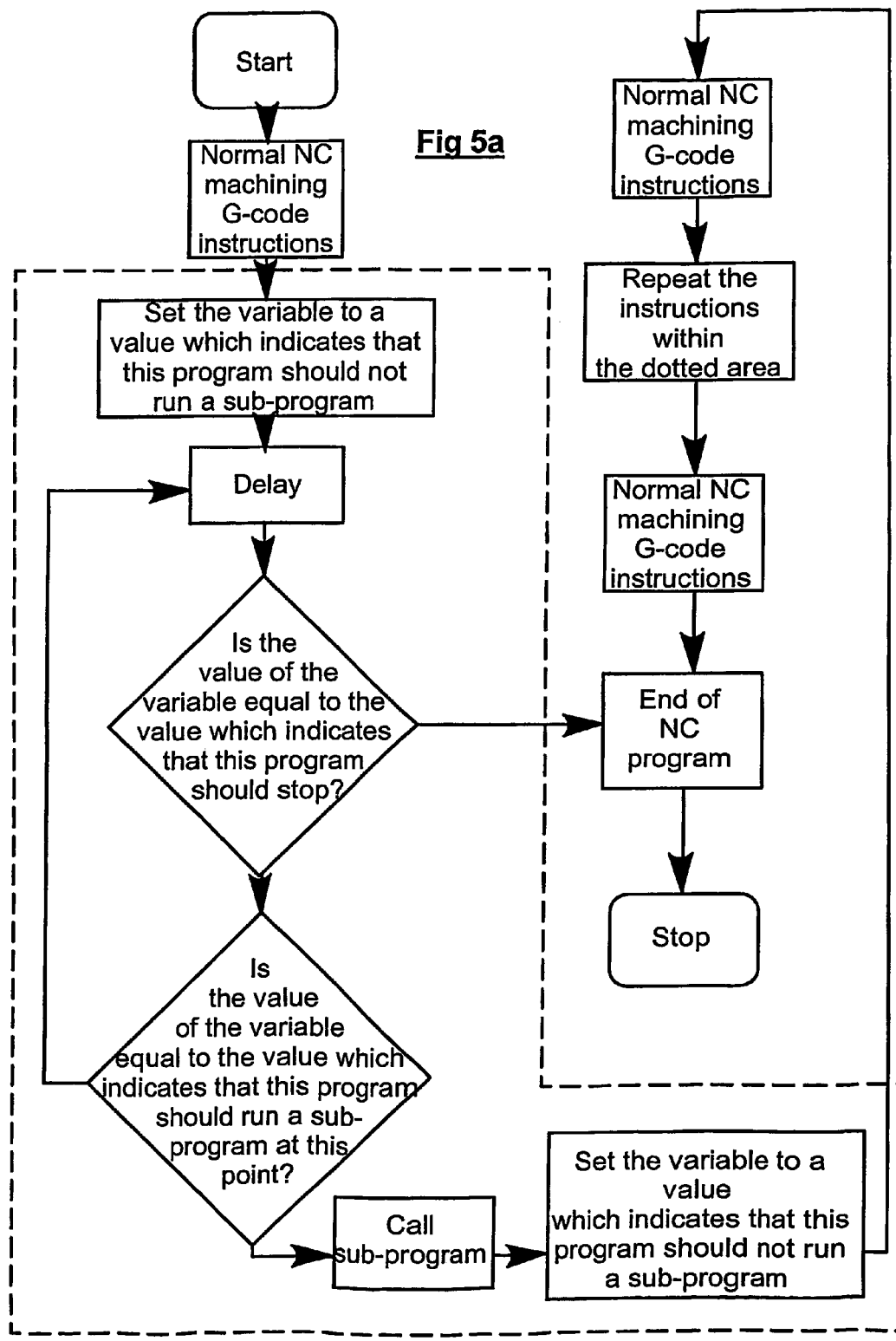

MACHINE TOOL CONTROL PROCESS AND APPARATUS THEREFOR

This invention relates to the control of machine tools having a numeric controller and ancillary computer control.

Figure 1:
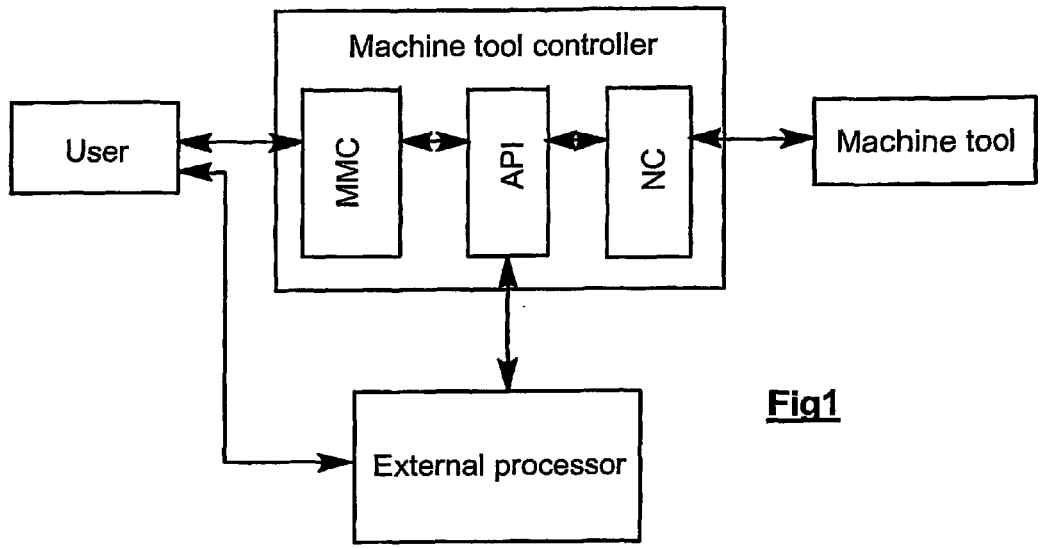

Conventionally machine tool control has been provided by systems similar to that shown in FIG. 1. They provide a programmable machine tool controller (called a numeric controller (NC)) which turns command codes into actual machine movements, rests, and cutting actions etc. The NC has programmable logic, processing ability, and is linked to some user interface (man-machine connection (MMC)).

Recently the MMC has been replaced in some instances with a computer running a commercially available operating system so that OEM's and third party software developers can introduce their own software.

Further developments have allowed access by OEM and third party software to the machine data such as program status, machine position and machine variables and the ability to transfer command code programs to and from the NC and MMC. Such access is gained by an interface known as an application programming interface (API).

However, such a system is limited because it is not possible to change command programs once they are running on the NC, but merely to override feed rates and to press the cycle stop button.

According to one aspect the present invention provides a machine tool control process employing a programmable machine tool controller and separate software, comprising the steps of:
 executing a program in the machine tool controller; and
 providing a step in the program which allows the program execution to be paused until the controller is signalled to continue by the separate software.

Preferably the separate software and machine tool controller communicate via an API.

Preferably the said step in the program is a pause caused by the controller's optional stop instruction being invoked, and wherein the external software restarts the NC program via the API.

Alternatively the said step in the program is a pause caused by the controller waiting for a variable used by the controller to be changed by the separate software.

Preferably the machine tool control process further includes the steps of:
 loading a sub-program to the machine tool controller before or during the step in the program; and
 running the sub-program after the step in the program.

Preferably the machine tool control process is repeated so that a subsequent sub-program is loaded to the machine tool controller.

Preferably the separate software is employed to generate instructions within the sub-program(s). Preferably the generation takes place whilst the program or sub-program is running.

According to another aspect the invention provides a machine tool control process employing a programmable machine tool controller and separate software, comprising the steps of:
 executing a program in the machine tool controller;
 operating the separate software to generate instructions within a sub-program during the machine tool process; and
 providing a step in the program which allows the sub-program to be performed.

Preferably the generation of the instructions by the separate software takes place following input into the separate software.

The invention extends to a software program suitable for the above processes.

Figure 2:
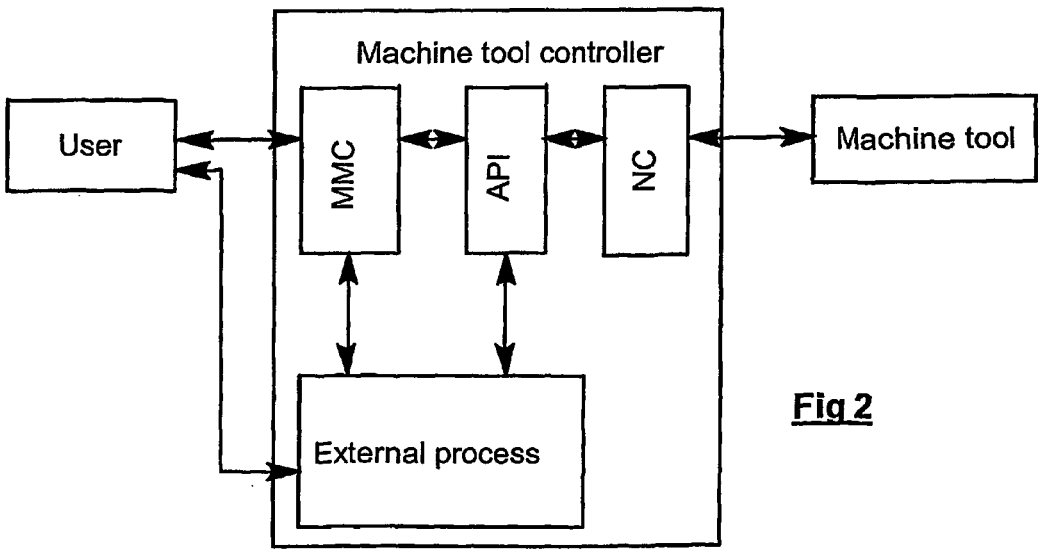
Figure 4B:
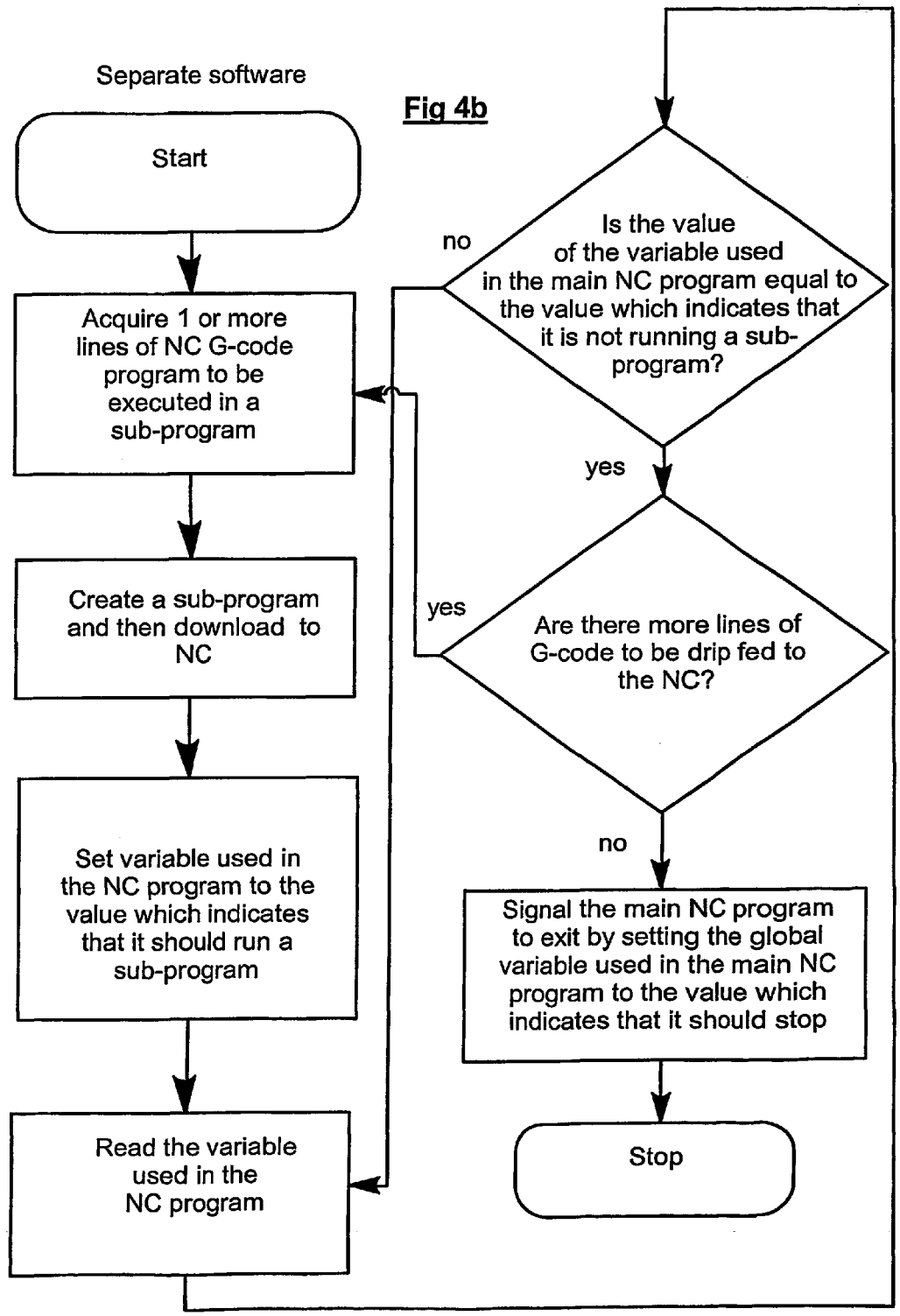
Figure 5B:
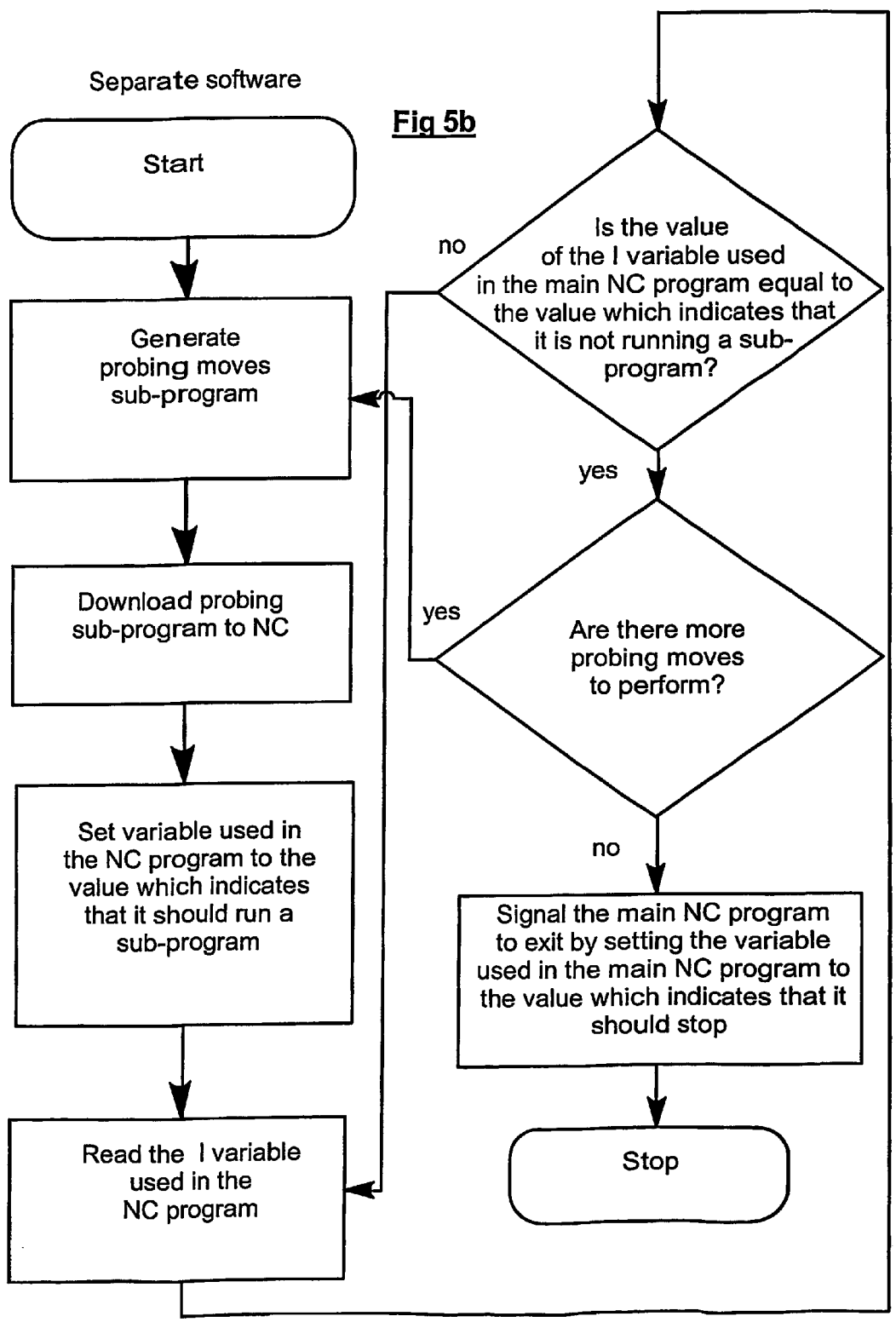

Embodiments of the invention will now be described with reference to the drawings, in which:
 FIG. 1 shows a machine control arrangement;
 FIG. 2 shows another machine control arrangement;
 FIG. 3 shows a flow chart of a process control utilising the invention;
 FIGS. 4a and 4b show flow charts of a process control utilising further the invention; and
 FIGS. 5a and 5b show flow charts for a process further utilising the invention.

FIG. 1 shows a process control arrangement for a machine tool. A machine tool is controlled by a programmable machine tool controller, usually called a numeric control (NC). The system shown has open architecture and therefore, access to data at the NC is possible via an application programming interface (API). In this description an API embraces any software which allows communication between two processes. Any communication protocol can be used depending on the type of proprietary NC used e.g. Dynamic Data Exchange (DDE). The MMC is used to load programs of "G code" commands into the NC via the API. In this system there is an additional external processor in this instance an external PC which communicates with the NC via the API also and has separate software which operates an external control process. The PC is used to load programs into the NC, to read the data of the NC and to control the program sequence of the NC.

FIG. 2 shows a similar arrangement to that illustrated in FIG. 1. The external processor is integrated into the machine tool controller but is still external in the sense that an external process distinct from the NC, communicates via the API. Separate software is utilised also.

Typically the arrangement of FIG. 1 might be used where retrofitting of a system for operating the invention were performed. The arrangement of FIG. 2 might be used where a system for operating the invention were newly built, and/or the software on the MMC allows either by design or unintentionally the integration of third party software.

FIG. 3 shows one example of a machine tool process utilising the process of the invention. Where for example it is required to take information from an NC (e.g. the X,Y,Z position of a machine tool spindle which is holding a measurement probe which is currently signalling that it is touching a workpiece surface) then the control process is looped until the data is read by the external process. The external process then sets a variable within the NC to a "continuing" value and the process continues. Such a control process allows the dynamic reading and writing of data at the NC without resetting the NC.

As an alternative to setting a variable, the machine's "optional stop" instruction may be used and the external process may be used to restart the process.

FIGS. 4a and 4b show another machine tool control process employing the process of the invention. FIG. 4a shows the NC process whilst FIG. 4b shows the separate software process. Both processes are run concurrently and communication between the two takes place via an API as illustrated in FIG. 3. Some NCs have the ability to accept one line of command code at a time only, known as "drip-feed" mode. Typically downloading of the program takes place using an external tape reader or computer, with each line being executed soon after it is received. Drip-feed mode is provided for NCs to allow large programs to be held using external storage medium such as a PC or a paper or magnetic tape reader, and fed to the controller in small sections (often a line at a time). The sections are executed immediately and then discarded. In this way programs that may be too large to fit in the controllers memory can be run.

One embodiment of the invention enables drip feed mode to be provided on NC devices that do not readily support it.

This is done by running a program on the NC which continually runs the following loop while a synchronisation variable in the program is not equal to the value used to exit drip feed:
i) set the synchronisation variable to a value that will cause the program to wait;
ii) wait for the synchronisation variable to have another value that will indicate that the subprogram is ready;
iii) call the subprogram;

Additionally, while this program is running on the NC, a separate process is running using separate software which in turn runs the following loop while there are more lines to drip feed:
i) get the next line(s) to be drip fed;
ii) format the line(s) as a subprogram
iii) wait until the NC is ready for a that subprogram i.e. is waiting for the subprogram;
iv) upload that subprogram to the NC
v) set the synchronisation value to a value that allows the NC program to run the sub-program An advantage of such a process control is that any line of code can be changed as the process progresses. So, for example where an alteration to a tool path is required as a result of an inspection step performed by the process, then that alteration can be made to a command line or lines prior to downloading. This alteration can take place in the separate software of the external processor whilst the NC program runs.

At the end of the process the external process is used to set the variable to a process stop value and the process is then terminated.

FIGS. 5a and 5b show further flow charts for yet another process for controlling a machine tool utilising the invention. In this system the NC and external process functions are similar to those described above. Again FIG. 5a shows the NC process whilst FIG. 5b shows the separate software process. Communication between the two is via an API. Instead of feeding a line of code the external processor is used to generate a sub-program (perhaps many lines of code long) which is inserted into the main program running on the NC. The downloading of the sub-program may take place at any time after its creation by, or arrival at the external process but before the external process sets the variable to the value which indicates that the NC may call and run that sub-program.

In a process where a machine is used to produce a workpiece it is often necessary to check that that component is correctly produced e.g. that its dimensions or surface finish are satisfactory. An inspection routine will be required for such checking and it may be necessary to adjust parameters of the process to produce a satisfactory workpiece.

In the process illustrated, the external process is capable of generating a workpiece-checking sub-program. The information required to do this may be input into the sub-program from one or a combination of places i.e. the main program which may or may not be running in the NC and/or from an external data source e.g. previous inspection sub-programs, and/or from user interaction. Once the sub-program is complete it may be downloaded to the NC (via the API) and the external process will set the variable in the NC to a "run sub-program" value. As detailed previously the NC main program is delayed and waits for that variable to be set by the external process. Once set the NC calls and runs the current sub-program.

Any number of sub-programs may be run during the process. Each sub-program may be different. For example an iterative process may take place whereby:
a main program operates a machining cycle to produce an article;
a sub-program is generated from the "G code" command lines of the main program, so as to inspect the dimensions of the workpiece produced by the main program;
the data is read by the external processor (maybe using the process described with respect to FIG. 3);
the main program is continued; and
a further sub-program is generated by the external process taking into account the inspection results of the first sub-program, this further program containing "G" code command lines to re-machine the workpiece correctly, or to alter the nominal cutting path of the machine so that further workpieces may be machined more accurately.

In the above example the process may be ongoing.

Reference is made in the description above to variables. In practice these are specific machine parameters like X,Y,Z coordinates, but the variable used to set the "run sub-program" or "don't run sub-program" flag will be a normally unused variable. It may be an integer or floating point variable or an on/off type variable, so may have a value or a state.

The external processor or process may be an industrial PC having standard architecture or a processor integrated into the NC device. Thus the "separate software" referred to in the claims may be incorporated in a device external to the NC or may be incorporated in the NC device itself as a parallel task. The external process referred to above is the separate software running on either an external processor or a processor integrated into the NC device.

Sub-programs in this application means any additional instructions to the NC device and includes macros used by the NC device.

What is claimed is:

1. A method of controlling a machine tool process employing a programmable machine tool controller performing the machine tool process and an ancillary computer on which separate software is implemented, the method comprising the steps of:
executing a machine tool process program implemented in the machine tool controller;
providing a step in the machine tool process program that allows the program execution to be paused until the controller is signaled to continue by the separate sotware; and
communicating between the machine tool controller and the ancillary computer, and the separate software of the ancillary computer signaling continuation of the machine tool process of the machine tool controller.

2. A method of controlling a machine tool process as claimed in claim 1, wherein the separate software and the machine tool controller communicate via an applications programming interface.

3. A method of controlling a machine tool process as claimed in claim 2, wherein:
the step in the program is a pause caused by an optional stop instruction of the machine tool controller being invoked, and the separate software restarts the machine tool process program via the applications programming interface.

4. A method of controlling a machine tool process as claimed in claim 1, wherein the step in the program is a pause caused by the controller waiting for a variable used by the controller to be changed by the separate software.

5. A method of controlling a machine tool process as claimed in claim 1, wherein the machine tool process further includes the steps of: loading a sub-program to the machine tool controller before or during the step in the program; and running the sub-program after the step in the program.

6. A method of controlling a machine tool process as claimed in claim 5, wherein the machine tool process is repeated so that a subsequent sub-program is loaded to the machine tool controller.

7. A method of controlling a machine tool process as claimed in claim 5, wherein the separate software is employed to generate instructions within the sub-program(s).

8. A method of controlling a machine tool process as claimed in claim 7, wherein the generation takes place whilst the program or sub-program is running.

9. A method of controlling a machine tool process employing a programmable machine tool controller performing the machine tool process and an ancillary computer on which separate software is implemented, the method comprising the steps of:
   executing a machine tool process program implemented in the machine tool controller;
   operating the separate software to generate instructions within a sub-program during the machine tool process;
   communicating between the controller and the ancillary computer; and
   loading the sub-program to the controller before or during a step in the program which allows the sub-program to be performed.

10. A method of controlling a machine tool process as claimed in claim 9, wherein the generation of the instructions by the separate software takes place following input into the separate software.

11. A method of controlling a machine tool process as claimed in claim 2, wherein the machine tool process further includes the steps of: loading a sub-program to the machine tool controller before or during the step in the program; and running the sub-program after the step in the program.

12. A method of controlling a machine tool process as claimed in claim 3, wherein the machine tool process further includes the steps of: loading a sub-program to the machine tool controller before or during the step in the program; and running the sub-program after the step in the program.

13. A method of controlling a machine tool process as claimed in claim 4, wherein the machine tool process further includes the steps of: loading a sub-program to the machine tool controller before or during the step in the program; and running the sub-program after the step in the program.

14. A method of controlling a machine tool process as claimed in claim 6, wherein the separate software is employed to generate instructions within the sub-program(s).

15. A method of controlling a machine tool process employing a programmable machine tool controller performing the machine tool process and an ancillary computer on which separate software is implemented, the method comprising the steps of:
   executing a machine tool process program implemented in the machine tool controller;
   setting, using the separate software, one of a continuation state, a run sub-program state, and a pause state for the machine tool controller;
   determining which of the continuation state, the run sub-program state or the pause state the software is set for the machine tool controller; and
   responding to the determination by at least one of running a sub-program implemented on the ancillary computer, pausing the machine tool process program, and continuing the machine tool process program.

16. A method of controlling a machine tool process as claimed in claim 15, wherein setting, using the separate software, one of a continuation state, a run sub-program state, or a pause state for the machine tool controller comprises setting a variable to a first value corresponding to the continuation state, a second value corresponding to the run-subprogram state, or a third value corresponding to the pause state.

17. A method of controlling a machine tool process as claimed in claim 16, wherein determining which of the continuation state, the run sub-program state or the pause state the software set for the machine tool controller comprising determining which of the first value, the second value or third value was set for the variable.

* * * * *